United States Patent [19]
Blanke

[11] 3,992,088
[45] Nov. 16, 1976

[54] BLANKETTE PROJECTOR

[76] Inventor: William C. Blanke, 601 Columbia Ave., North Bergen, N.J. 07047

[22] Filed: May 5, 1975

[21] Appl. No.: 574,532

[52] U.S. Cl. ............................... 353/26 R; 352/123
[51] Int. Cl.² ..................... G03B 23/12; G03B 21/04
[58] Field of Search ................... 353/26 R; 352/123

[56] References Cited
UNITED STATES PATENTS

| | | | |
|---|---|---|---|
| 2,037,705 | 4/1936 | Chapman | 353/26 R |
| 2,755,030 | 7/1956 | D'Ornellas | 352/123 |
| 3,586,431 | 6/1971 | Fraser | 353/26 R |
| 3,724,775 | 4/1973 | Nupnau | 352/123 |

*Primary Examiner*—Steven L. Stephan
*Attorney, Agent, or Firm*—Richard L. Miller

[57] ABSTRACT

A projector containing a group of eigth film cassettes which are selectively slidable into a position between a lens and an electric light so to project an image upon a screen upon a front side of a case that contains the entire device, the film cassettes containing micro file upon which sheet music is photographed so that the cassettes contain a large library of sheet music, and the case being adaptable for placement upon a piano or in front of a musician playing any other instrument.

2 Claims, 6 Drawing Figures

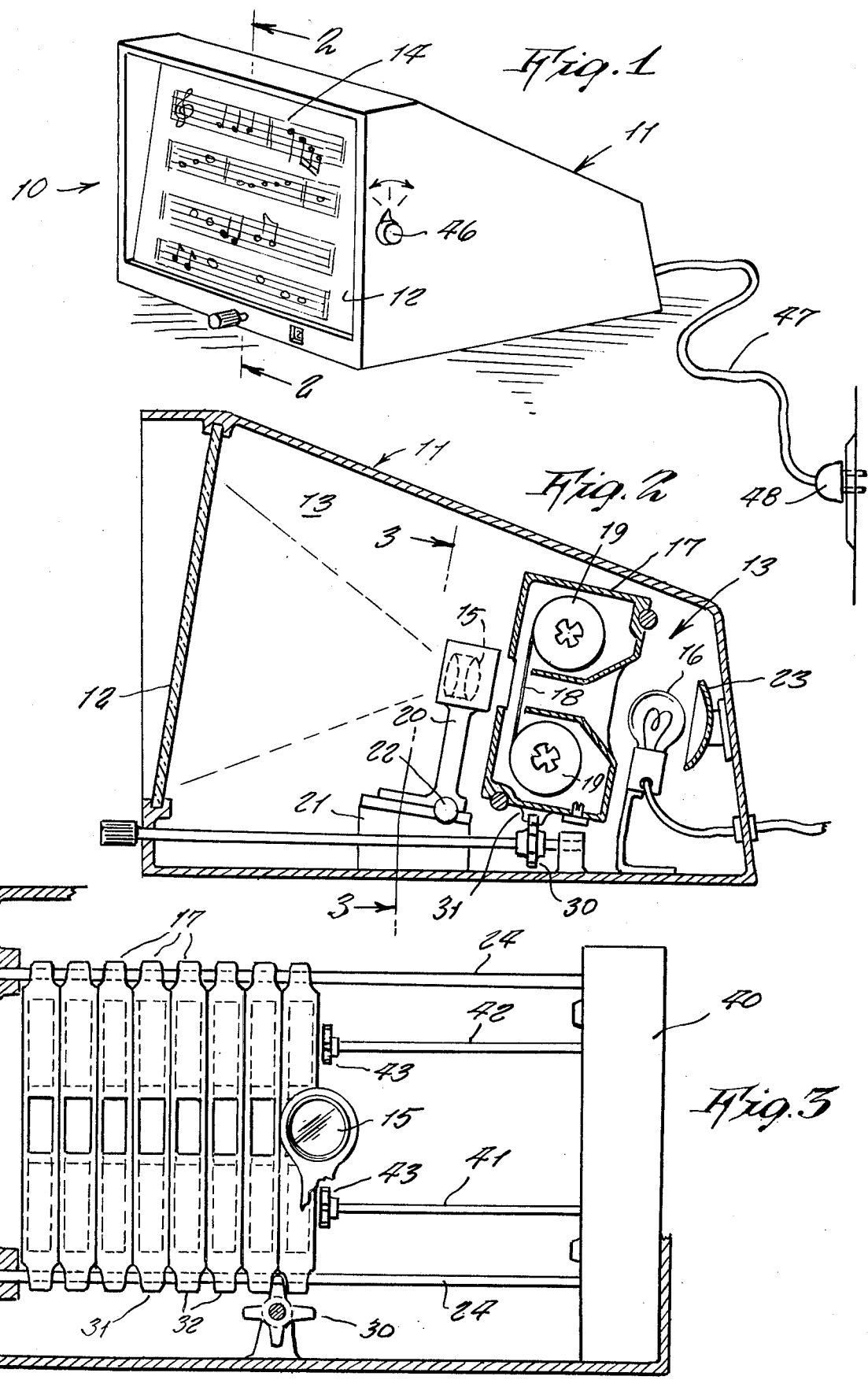

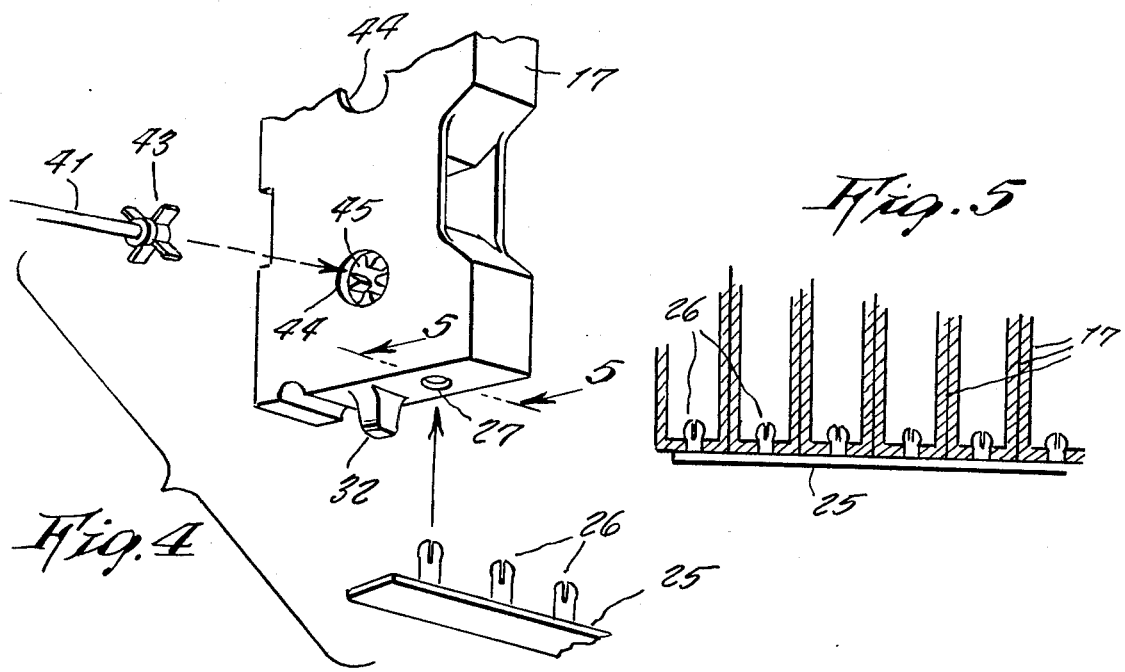
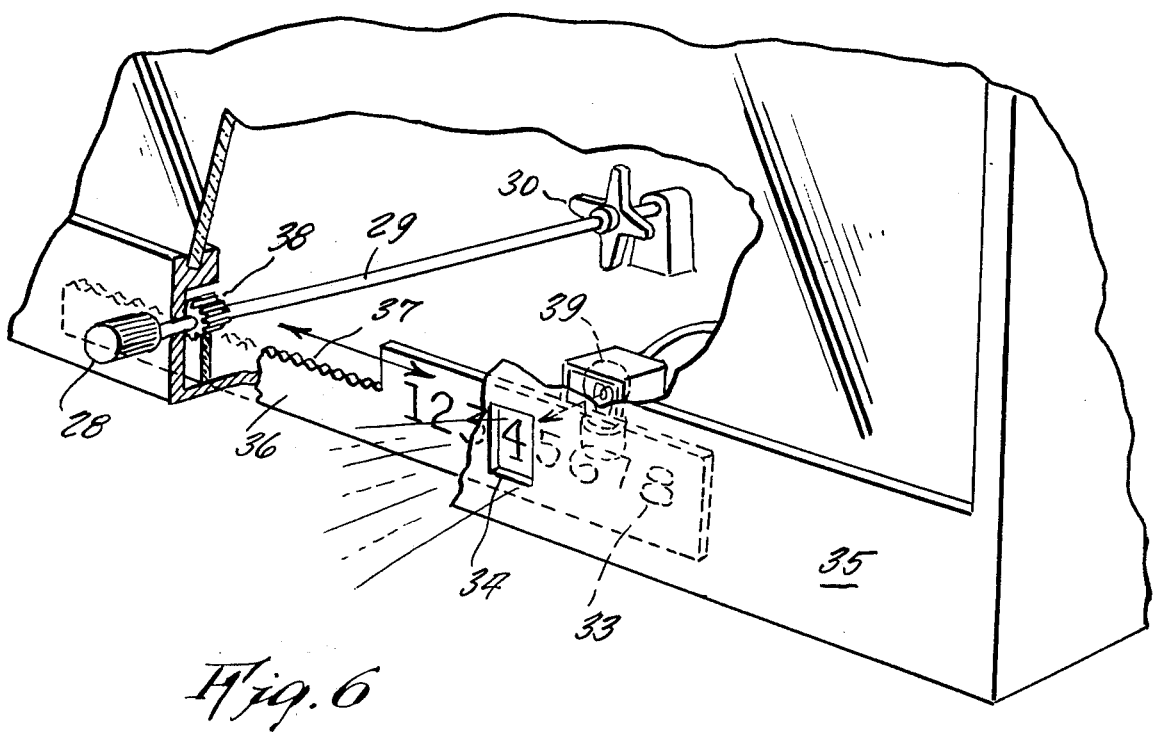

BLANKETTE PROJECTOR

This invention relates generally to the field of music. More specifically, it relates to file projectors.

A principal object of the present invention is to provide a projector containing a large library of filmed sheet music for being selectively viewed upon a large screen, and which can easily contain 500 or more songs or other musical works.

Another object is to provide a music projector in which the songs or musical works are stored in alphabetical order upon cassettes of micro film.

Still another object is to provide a music projector wherein the music is better illuminated for being seen than would be possible in an ordinarily lighted or poorly lighted room, and wherein the projector can be made to display an image that is even larger than a printed music sheet, so that several musicians playing together can all see the same music.

Other objects are to provide a Blankette music projector which is simple in design, inexpensive to manufacture, rugged in construction, easy to use and efficient in operation.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention.

FIG. 2 is a cross sectional view taken on line 2—2 of FIG. 1.

FIG. 3 is a cross sectional view in direction 3—3 of FIG. 2.

FIG. 4 is a detail view showing how the cartridges are attached together.

FIG. 5 is a cross sectional view along line 5—5 of FIG. 4 and showing several cartridges attached together.

FIG. 6 is a detail perspective view showing a mechanism for visually identifying which cartridge is aligned for being viewed.

Referring now to the drawings in detail, the reference numeral 10 represents a Blankette music projector according to the present invention, wherein there is a case 11 of a suitable size for placement upon a piano, or upon any other supporting surface such as a table or the like, a front side of the case having a large projection screen 12. Within the interior of the case, there is a mechanism 13 for projecting an image 14 of a sheet of music upon the rear side of the screen. The screen is of translucent material so the image can be seen from the front by a person.

The mechanism 14 includes a lens 15 and an electric lamp 16 between which any one of a set of cassettes 17 are slidable so to display a micro film 18 which at its opposite ends is wound upon reels 19 contained within the interior of each cassette. The lens is supported in a frame 20 adjustably supported upon base 21 by means of rotatable control knob 22. The lamp is stationarily positioned in front of a fixed reflector 23.

The cassettes are supported slidably along two transverse rods 24 supported in side walls of the case, and the cassettes are detachably attached together by a strap or band 25 having male plugs 26 that can snap into openings 27 on an underside of each cassette, as shown in FIG. 4, and which allows replacement or interchange of cassettes when other music is wished to be contined in the music projector.

The cassettes are made to slide along the rods 24 so that any specific one of the cassettes is aligned with the lens and lamp for projection upon the screen. This is accomplished by a rotatable control knob 28 at a front of the case and which is mounted on a shaft 29 having also a gear 30 that engages a toothed rack 31 that is formed by a single tooth 32 being molded on an underside of each cassette case so that the single teeth thus together form the rack 31. Thus the cassettes can be slid either toward a left or right.

In order that a person can be sure that a selected cassette is the one that is aligned with the projecting lens 15, each cassette is associated with a different number 33 that appears in a window opening 34 on the case front wall 35 of the case, as the knob 28 is rotated. The numbers are printed on a slidable transluscent plate 36 having toothed rack 37 engaging a gear 38 on the shaft 29, the plate being in front of a shielded electric lamp 39 so to illuminate a selected number in the window opening. Thus different ones of the cassettes are selected remotely without looking inside the case.

Each cassette film contains possibly hundreds of song sheet pages photographed thereupon, and after a person has brought a selected one of the cassettes behind the lens, he must then reel the film forewardly or rearwardly so to get the selected song exposed behind the lens. This is accomplished by a two directional electric motor 40 adjacent one side wall of the case, the motor driving two motor shafts 41 and 42 in a same direction. Each shaft has a spline 43 on its outer end. Each cassette has a pair of openings 44 through the cassette case that align with a toothed opening 45 through a center of each reel 19, as best shown in FIGS. 2 and 4. The splines 43 are positioned so to engage the toothed opening 45 of a cassette when it is aligned with the lens. As shown in FIG. 3, it is to be noted that the shafts 41 and 42 are of sufficient length so to extend through all the cassettes when the cassettes are slided toward a right in order that the endmost left cassette can be aligned behind the lens. The support rods 24 are long enough so that all the cassettes can be slided toward right or left and any one thereof align with the lens. After a selected cassette is thus aligned with the lens, a switch 46 on the case can be turned either to a left or right so to run the motor either forwardly or rearwardly in order that any song on the film strip is aligned behind the lens. Preferably each song or composition on the film should be numbered with a consecutive number whereby a person can more quickly locate it if he knows its number so to run the motor either forwardly or rearwardly.

The lamps 16 and 39 and the motor are connected to an extension cord 47 extending outwardly of the case and fitted with a plug 48 for connection to an electric power source.

Thus a Blankette music projector is provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. In a music projector, the combination of a case having a transluscent screen on its front side, and a mechanism inside said case for projecting a music sheet page image upon a rear side of said screen for being viewed from a front side of said screen, said mechanism including a lens, a first electric lamp with a reflector, a space between said lens and lamp into which a plurality of film cassettes are slidable for selected alignment therebetween, each cassette containing a film strip wound at its opposite ends upon a pair of reels so to expose a portion therebetween for alignment with said lens and lamp, said film having a plurality of music sheet pages photographed thereupon, wherein said cassettes are slidably supported upon a pair of transverse rods supported in side walls of said case, said cassettes being detachably attached to a band so to slide together, and a tooth on each cassette together forming a toothed rack, said rack being engaged by a first gear on a shaft of a rotatable control knob at a front of said case, wherein a second gear on said control knob shaft engages a toothed rack of a transluscent plate having a sequence of different numerals imprinted thereupon and movable behind a window opening in said case front wall, and a second lamp inside said case being behind said plate and aligned with said window opening.

2. The combination as set forth in claim 1 wherein a two directional motor inside said case has two output drive shafts, a spline on an end of each shaft, each said cassette having a pair of transverse openings therethrough aligned with toothed openings through a center of each said reel, said toothed openings being engageable with said drive shaft splines.

\* \* \* \* \*